US008396834B2

(12) United States Patent
Bahadori et al.

(10) Patent No.: US 8,396,834 B2
(45) Date of Patent: Mar. 12, 2013

(54) REAL TIME WEB USAGE REPORTER USING RAM

(75) Inventors: Hamid Bahadori, Redwood City, CA (US); Hemanth Puttaswamy, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 11/546,923

(22) Filed: Oct. 11, 2006

(65) Prior Publication Data

US 2008/0086454 A1 Apr. 10, 2008

Related U.S. Application Data

(60) Provisional application No. 60/850,961, filed on Oct. 10, 2006.

(51) Int. Cl.
*G06F 7/00* (2006.01)
(52) U.S. Cl. .......................... 707/640; 707/674; 711/126
(58) Field of Classification Search .............. 707/1, 200, 707/201, 202, 204, 640, 674; 711/126
See application file for complete search history.

(56) References Cited

U.S. PATENT DOCUMENTS

| | | | |
|---|---|---|---|
| 5,764,912 A | 6/1998 | Rosborough | |
| 6,035,411 A * | 3/2000 | Yomtoubian | .................. 714/6.2 |
| 6,266,649 B1 | 7/2001 | Linden et al. | |
| 6,505,305 B1 | 1/2003 | Olarig | |
| 6,675,177 B1 * | 1/2004 | Webb | ................................ 1/1 |
| 6,782,370 B1 | 8/2004 | Stack | |
| 6,912,505 B2 | 6/2005 | Linden et al. | |
| 6,996,536 B1 * | 2/2006 | Cofino et al. | ................... 705/26 |
| 7,089,304 B2 | 8/2006 | Graham | |
| 7,113,917 B2 | 9/2006 | Jacobi et al. | |
| 7,359,935 B1 | 4/2008 | Karipides et al. | |
| 2002/0042821 A1 | 4/2002 | Muret | |
| 2002/0065912 A1 | 5/2002 | Catchpole et al. | |
| 2003/0084343 A1 * | 5/2003 | Ramachandran et al. | ..... 713/201 |
| 2004/0054784 A1 | 3/2004 | Busch et al. | |
| 2004/0070606 A1 * | 4/2004 | Yang et al. | ..................... 345/745 |
| 2005/0120045 A1 * | 6/2005 | Klawon | ....................... 707/102 |
| 2005/0166138 A1 | 7/2005 | Kundu | |
| 2005/0183143 A1 * | 8/2005 | Anderholm et al. | ............ 726/22 |
| 2005/0229031 A1 * | 10/2005 | Kojenov et al. | .................... 714/6 |
| 2006/0212459 A1 * | 9/2006 | Sugimura | ..................... 707/100 |
| 2006/0277197 A1 * | 12/2006 | Bailey | .............................. 707/10 |
| 2007/0011304 A1 * | 1/2007 | Error | .............................. 709/224 |
| 2007/0078625 A1 * | 4/2007 | Murphy et al. | ............... 702/176 |
| 2007/0118693 A1 * | 5/2007 | Brannon et al. | .............. 711/118 |
| 2007/0213857 A1 * | 9/2007 | Bodin et al. | .................... 700/94 |
| 2008/0172324 A1 * | 7/2008 | Johnson | .......................... 705/38 |

FOREIGN PATENT DOCUMENTS

EP 1376409 A1 1/2004

* cited by examiner

*Primary Examiner* — Amy Ng
(74) *Attorney, Agent, or Firm* — Winstead, P.C.

(57) ABSTRACT

A system that improves the real time presentation of web analytics data to clients. Real time data is improved in one embodiment by using a messaging system that directs the data stream to RAM memory, before it is sent to the database. A separate path is provided for presenting the real time data, which does not require going through the main database. The data is serialized and streamed in batches at an interval which can be set from the order of seconds to minutes. Additionally, the data is aggregated in RAM according to the desired groupings of data, so that the aggregation is pre-computed.

21 Claims, 6 Drawing Sheets

SESSIONIZER DATA FLOW

REAL TIME WEB USAGE REPORTER USING RAM

CROSS-REFERENCE TO RELATED APPLICATIONS

This patent application is a non-provisional of and claims the benefit of U.S. Provisional Patent Application No. 60/850,961, filed on Oct. 10, 2006; which is incorporated by reference in its entirety for all purposes. The present invention is related to a co-assigned application entitled "Session Based Web Usage Reporter," filed Oct. 6, 2006, Ser. No. 11/544,300, the disclosure of which is hereby incorporated herein by reference.

BACKGROUND OF THE INVENTION

The present invention relates to on-demand web analytics, and in particular to real-time reports.

Companies hosting web sites have a need to monitor how effective those websites are. The most basic tracking approach is to record basics data on the number pages viewed and the number of visitors to the web site. More advanced applications track a host of additional detailed features and elements of a website. The data collected include what parts of a website a user clicks on, when a user chooses to include an item in the shopping cart, purchase an item, and other shopping actions, registration events, viewing of products, payments actions, etc. Typically, tags are associated with different resources on a web site to track such activities.

More recently, tracking has been done not just of URL based resources, but also of local applications downloaded from a web site as part of a web page and run locally on a user's computer. Such local applications include Flash and Ajax. This has been described as tracking the applications within a web resource by using ActionScript and/or Java Script, the languages used to write such applications.

The data collected by the tracking software is stored in a database, where it is analyzed, validated, checked and formatted. The processing and storing of the tracking data in the database requires substantial time. Examples of validating collected data include eliminating duplicate click data, and comparing the collected click data to established limits to eliminate probable click fraud. The data, after processing and based on established business rules, is then presented to the client (the company that owns the website) using various delivery mechanisms such as a browser application, data downloads, data exports, web based API, emails, and other delivery mechanisms.

A web site may also be tracked based on user sessions. IBM US Published Application No. 20040054784, entitled "Method, system and program product for tracking web user sessions" describes one such system. When a user requests a web page, code within the web page generates a unique identifier which is transmitted to the analytics server along with an identification of the web site and the referring web site. The analytics server then downloads a session cookie so that activity with respect to that session can be tracked.

Urchin Software Published Patent Application No. 2005/0165889 is an example of a web analytics system that includes real-time reporting. Data is loaded into a relational database, using RAM to assemble the data to be loaded. The data pulled from log files, then parsed and stored in a visitor centric manner with hash tables.

FIG. 1 is a block diagram of an example of a tracking system. A web server 10 provides web pages, flash, and other local applications 14 that are addressable by URLs 12. Each of these web based resources has an associated tag 16 and 18, respectively, for tracking clicks by users 20. The tags collect the user click information and transmit it over the internet 22 to a web analytics server or tracking server 24.

Web analytics server 24 collects the data received by a web server 19 with a collector component 26, and assembles queues of data in transformer components 28. The transformed data is then loaded into a database 32 by a loader 30. The data in the database is analyzed, checked, and validated over time, then provided to a user using various delivery mechanism such as a browser application, data downloads, data exports, web based API, emails, and other delivery mechanisms from a web reporter server 25 through Internet 22 to a client computer 34.

BRIEF SUMMARY OF THE INVENTION

The present invention provides a system that improves the real time presentation of web analytics data to clients. Real time data is improved in one embodiment by using a messaging system that directs the data stream to RAM memory, before it is sent to the database. A separate path is provided for presenting the real time data, which does not require going through the main database. The data is serialized and streamed in batches at an interval which can be set from the order of seconds to minutes.

In one embodiment, the real time presentation is also improved by storing the data in a manner that is quickly retrieved. For example, the data is aggregated in RAM by services applications on a RAM server according to the desired groupings of data, so that the aggregation is pre-computed (e.g., aggregation for the last minute or minutes, hour, half day, etc.). Later requests for different granularities of time periods can be satisfied immediately, since they are precomputed. Data is also stored separately for different viewer presentations. For example, trend data of total items in shopping carts over the last few hours or days is stored separately from the current number of items in shopping carts. This enables different types of data to be provide asynchronously and quickly to different reporting modules. With each new arriving batch of streamed data, the different granularities are recomputed.

In one embodiment, real-time performance is enhanced by processing upstream from the RAM server. The streamed data is processed upstream to organize it by client (website owner) and by session in a session transformer or "sessionizer." The sessionizer organizes the data by session, computes session metrics, and does the first level of aggregation desired, in the seconds to minutes range (e.g., every 30 seconds, 5 minutes, etc.)

In one embodiment, data from other sources is also stored in RAM. For example, the RAM can receive and store various kinds of alerts (e.g., product underselling, overselling), an RSS feed through the internet (such as industry reports of sales on similar products), and incoming web services APIs (such as, for the same client, not only web data, but call center data and bricks and mortar store data, giving a complete overview of total product sales. The reports on the real time window of a client computer are modularized, so that each is asynchronous with respect to the others, and independently requests its data from the Real time analytics server.

In one embodiment, the amount of data is limited to a short yet marketing significant period, such as 48 hours to several weeks, to make a RAM implementation economically feasible. In addition, 3-way redundancy may be provided to allow quick recovery from crashes: (1) multiple fail-over RAM based real time analytics servers; (2) local disk storage in flat file format for quick re-loading and re-aggregating without conversion; (3) disk storage associated with the upstream processing, such as the session aggregator or transformer, allowing the data to be re-streamed.

DETAILED DESCRIPTION OF THE INVENTION

Overall System

Figure 1:
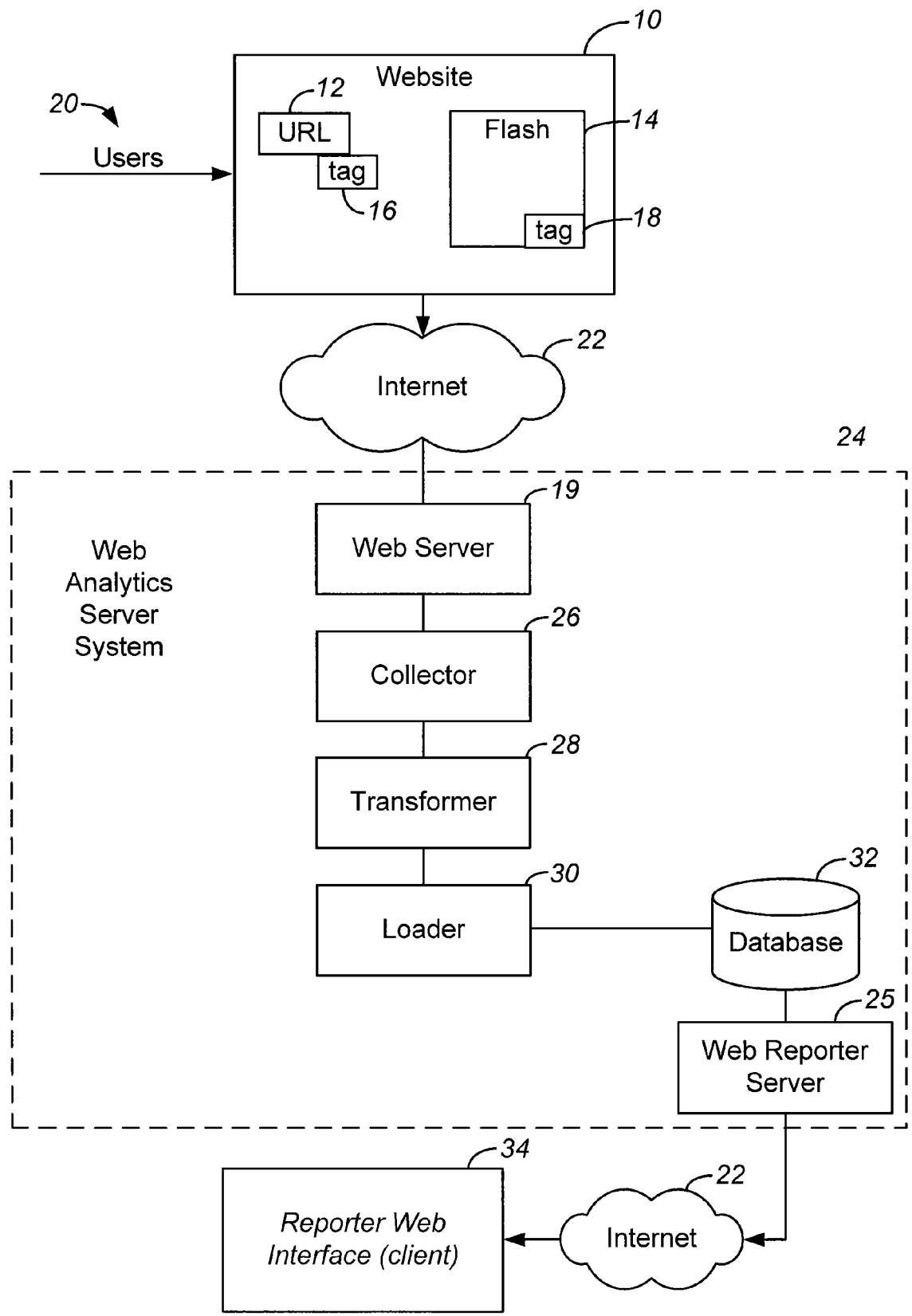
FIG. 1 is a block diagram of a prior art tracking system.
Figure 2:
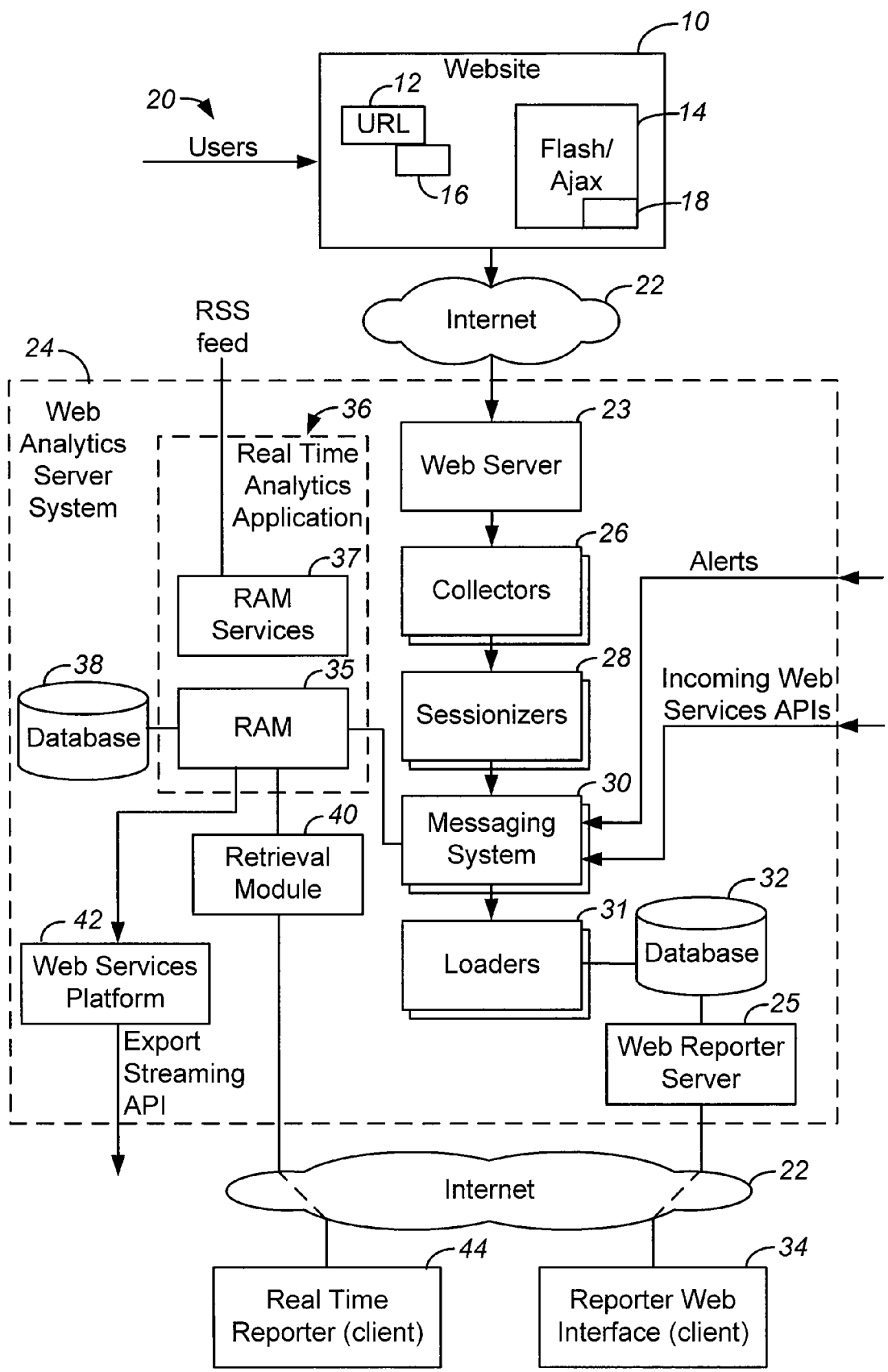
FIG. 2 is a block diagram of a real-time tracking system using RAM according to an embodiment of the invention.

FIG. 2 is a block diagram of a tracking system based on user session data according to an embodiment of the present invention. A web server 10 provides web pages which are downloaded to a client (user) computer, and include URLs 12 and Flash, Ajax, Java, or other local applications 14. Each of the components referred to has associated metadata request elements 16 and 18, respectively, for tracking clicks by the users 20. The metadata request elements collect the user click information and transmit it over the internet 22 to a web analytics or tracking server 23.

Data is initially provided to a group of web servers, or pixel servers, 23 as a log of click stream data. Multiple collectors 26 pull the data, sort the data by session (using the session ID), and provide the data in multiple messaging queues to the sessionizers (transformers) 28. The data for the same session is sent to the same sessionizer based on a hash ID algorithm. The sessionizers organize the collected data as discussed below, then provide it in different formats and based on various business and statistical logic through a variety of different messaging systems 30 to different targets that include but are not limited to: 1—real time in-memory streaming for real time in-memory analytics 2—real time in memory streaming through a variety of application APIs for other applications. 3—used for long term database loading or other storage media.

Any of these messaging systems 30 can pass on any number of well defined alerts coming from any external sources to the RAM 35. RAM 35 may also directly receive an RSS feed through the internet. Thus, data from different sources including the session data from the sessionizer, the alerts or other data types from other external sources can be combined and processed, using any business logic or statistical data analysis in the RAM and made available for real time viewing to any target. Examples include, for the same client, not only web data, but call center data, bricks and mortar store data, giving a complete overview of business models defined and represented using the data.

The data in RAM 35 is provided to a variety of web services platforms 42, which are available for external vendors to pull through any APIs for export streaming. Also, the data from RAM 35 is accessed by a real time browser based application 44. Real-Time Analytics Application 36 includes RAM for storage 35 and RAM based services 37. RAM based services 37 are programs stored in the main memory of a server which controls the storing, processing, aggregating, accessing, authenticating, authorizing, etc. of data in the RAM. Such services include a de-serializing service, an aggregator service, a localizer service, a security service, a messaging service, a recovery service, and/or any other service defined on the data in RAM.

Real time reporter 44 may reside on a client computer or may be downloaded from a web analytic server, and can use Flash, Ajax, a local application or other methods for requesting and rendering reports. The data for the reports is requested from Web Analytics Server 24 across the Internet 22. Independent modules within the real time reporter program 44 will retrieve data in RAM 35 from real time analytics application 36 asynchronously using interface module 40, through different protocols (HTTPs, Flash, Ajax, etc.) for the real time interactions.

The system of FIG. 2 is designed to respond at the speed of accessing the data in memory and processing the data in memory. It can also handle data for a large number of clients across a large number of geographically distant web servers. In one embodiment, collectors 26 include a large numbers of servers, with associated disk drive storage. There could typically be fewer servers for sessionizers 28, and even fewer servers making up messaging system 30, all with associated disk drives. Loaders 31 may include dozens of servers and associated disk drives. RAM 35 could be a single or multiple banks of RAMs.

Session Based Tracking

Figure 3:
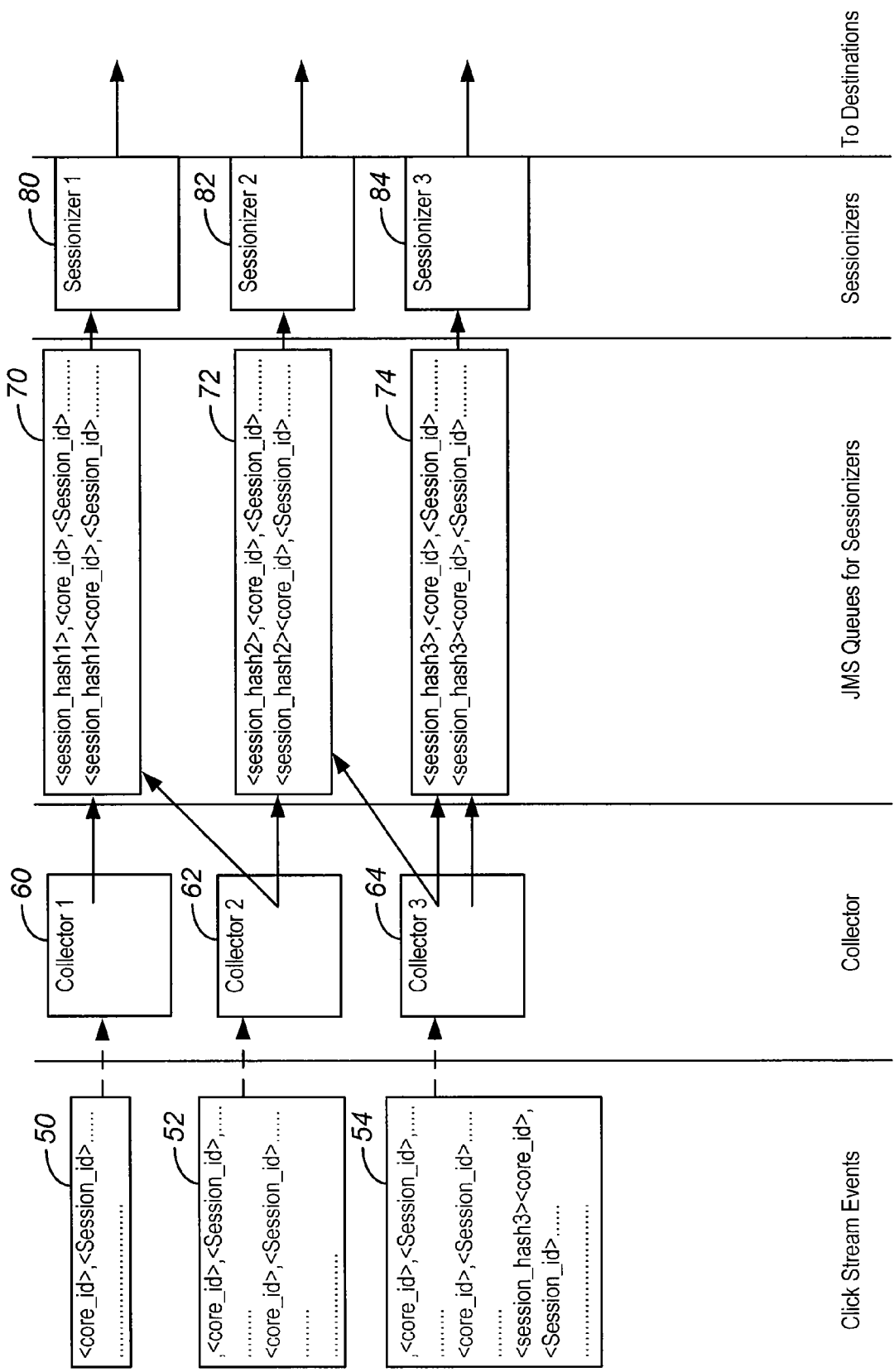
FIG. 3 is a diagram of the flow of tracking user session data according to an embodiment of the invention.

FIG. 3 is a diagram of the flow of session tracking data according to an embodiment of the invention. Tracked data is sent over the Internet by metadata request elements downloaded to the browser of the computer utilized by any visitor to a client web site. as described above. This data is grouped into click stream events 50, 52 and 54 which are sent to collector 26 on the web analytics server system. In addition to the tracking ID of the prior art (here, the cookie id is labeled <core_id>, for Coremetrics ID), a session ID is created and assigned by the web analytics server to each new session. The log of information tracked by the metadata request elements is thus associated not only with a core ID, but a session ID as well.

Each activity tracked and stored includes the core ID and the session ID. Each stored activity is assigned a time stamp. The time stamp allows establishing the sequence of events and allows easy analysis of the activities that led to other activities. Any session is maintained active as long as the user has his browser open, with a timeout ending the session if there is no activity for a designated time period.

After the click stream events are transmitted over the internet to the web analytics server system, they are received by various instances of web servers, 60, 62, and 64. The collectors examine the session ID, and route the data to appropriate hashed message queues 70, 72 and 74 based on hash bucket IDs. Thus, all data on the same session is sent to the same queue. In the course of such processing, load balancing is performed. The different collectors communicate with each other to identify queues that have been assigned to a particular session ID. If a new sessionizer is added to the topology of the current sessionizers, they automatically reconfigure with all the routing changes.

The data from the queues are sent to sessionizer instances 80, 82 and 84 residing in sessionizer servers 28. The sessionizers are transformers that take individual click data and transform it into different formats, such as data warehouse loadable data, data optimized for real time analysis, etc. In addition, the click events are aggregated to give the complete session data. In order to be able to completely recover from any disaster, sessionizers, store their in-memory data based on a defined policy in hierarchical common storage. Session Objects are stamped with their segmentation group IDs as and when the information is available in a click. For example, when an order is complete a click is processed, a segmentation ID based on the purchase order level can be stamped, and another segment ID based on the kind of goods bought can be stamped.

Metrics

The sessionizer data metrics provided include (1) in-flight metrics for sessions that are still active; (2) completed session metrics and (3) current session or snapshot statistics (how many people are on the site, how many shopping carts are active, how many items are in carts, etc.). If there has been no activity for a predetermined time, a session is deemed timed-out, and thus completed.

Sessionizer Data Flow

Figure 4:
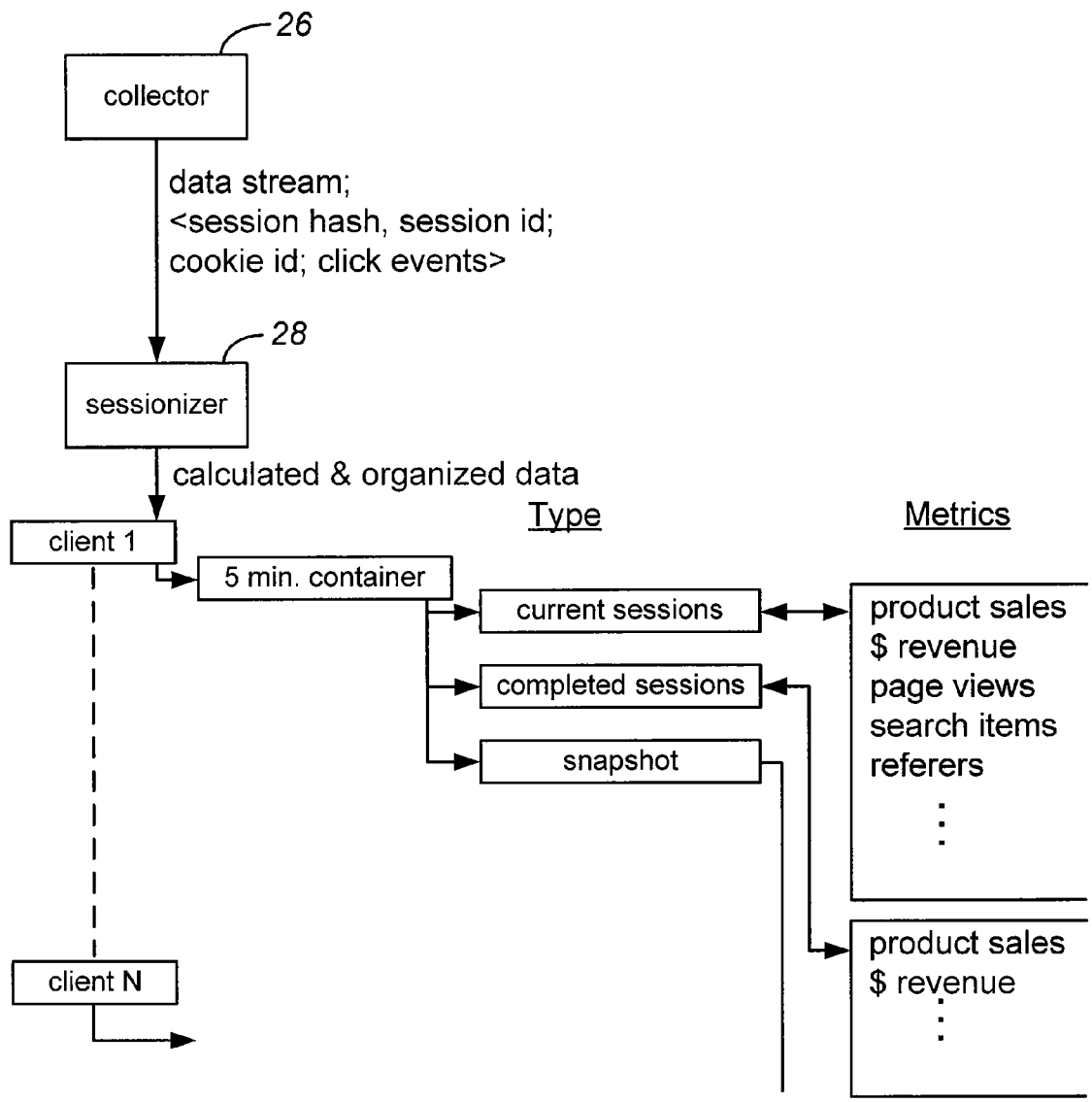
FIG. 4 is a diagram of the flow of data through the sessionizer according to an embodiment of the invention.

FIG. 4 is a diagram of the flow of data through the sessionizer according to an embodiment of the invention. The data stream in a queue from one of collectors 26 to one of sessionizers 28 is shown. The data stream consists of a session hash, session ID, cookie ID, and click events. Other data may be included. This data is received by the sessionizer, which organizes the data into sessions, calculates various session metrics, and groups the data.

The data sent by the sessionizer to the messaging system, for forwarding to Real Time Analytics Application 36, includes data grouped by client as shown. For each client, a 5 minute grouping is provided. Alternate groupings may be done, from in the range of seconds to the range of minutes. The grouping can, in one embodiment, be varied on a per client basis. The grouping includes 3 categories of sessions: (1) current sessions, (2) completed sessions, and (3) a snapshot of current activity. For each grouping, a wide variety of metrics are provided. Any metric that may be displayed to a user in a real time calculation is measured or calculated by the sessionizer and included in the data.

The metrics can include client requested custom metrics, such as tied product sales (e.g., to measure a promotion, such as buy shoes and get socks ½ off). Segments can be defined and included, with multiple levels (e.g., referrals from Google that bought shoes). Other examples are top 10 items browsed, bought, etc., and the corresponding bottom 10. By grouping into sessions, the sessionizer is able to provide additional metrics, such as referral sources, time of session, session conversion rate, etc.

After the data has been organized by the sessionizer, it is sent to real time analytics application 36 through the messaging system as a serialized stream. One of the services in RAM services 37 is a de-serialization service 408. The de-serialized data is then stored in RAM 35.

An aggregator service 416 periodically aggregates the data, then stores it in RAM 35. Aggregation may be done on all or a portion of the data. Aggregation can be done based on various factors, such as time or geography. For example, data could be aggregated every 30 seconds or every few minutes. Larger time increments of every 5 or 10 minutes of data, every hour, half day and day could be stored. The aggregation periods can be changed if desired, and can be different on a per client or other basis. The incoming data from the sessionizer is already grouped at the first level of aggregation. If this level is 5 minutes, and the next desired level is 15 minutes, then every 15 minutes the aggregator service will run to aggregate the metric data from the last 3 batches of 5 minute data. Similarly, every 30 minutes the aggregator service will aggregate the last two 15 minute aggregations, and so on.

Figure 5:
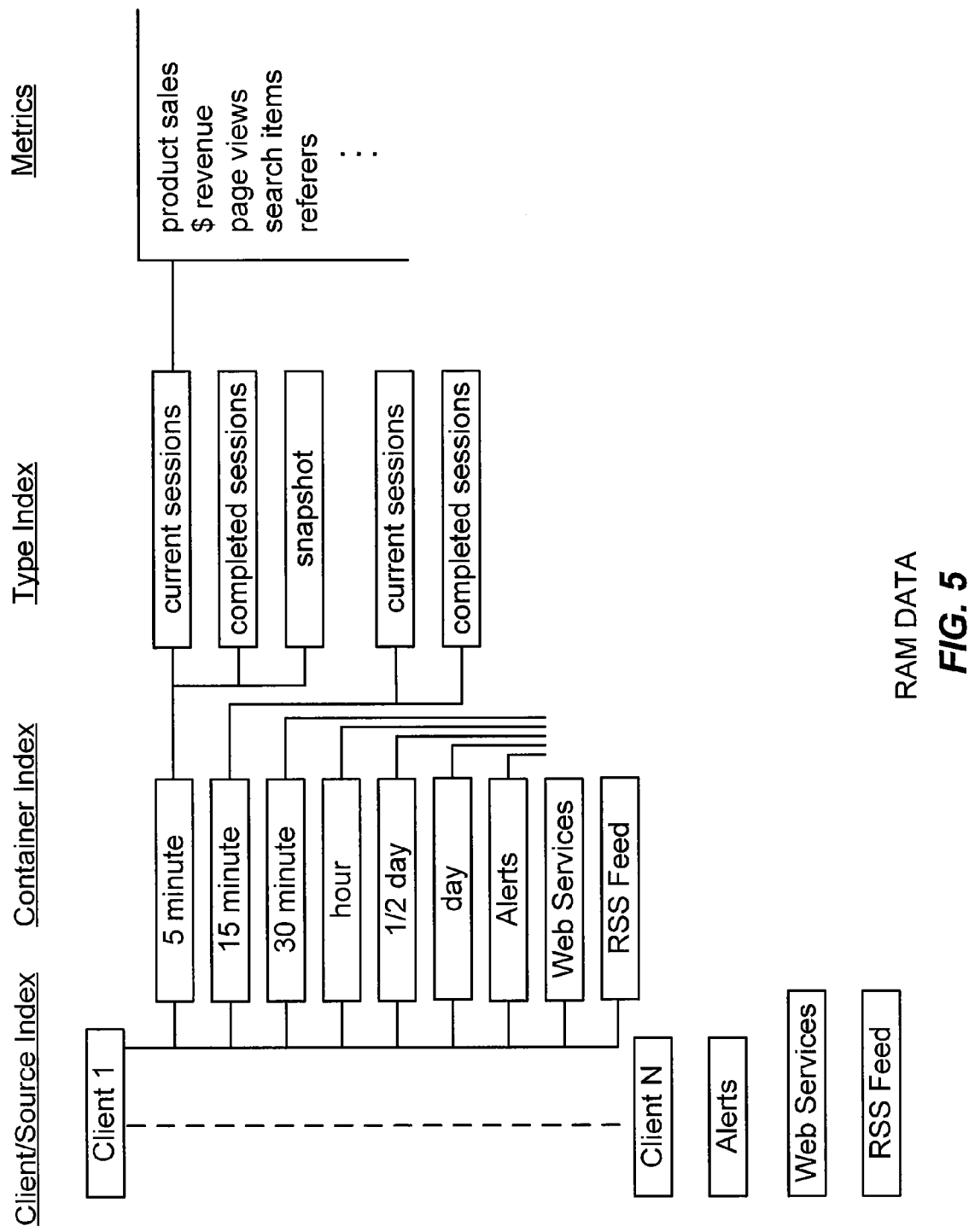
FIG. 5 is a diagram of the data structure in RAM according to an embodiment of the invention.

FIG. 5 illustrates the resulting hierarchical data structure in RAM. At a first level, the data is organized by client. The data by client is then indexed by the different aggregation levels, such as 5 minutes, 15 minutes, 30 minutes, hour, half day, day. Other values could be used, such as every 5 seconds or every week. For each aggregation level, the data is grouped into, for example, 3 categories: current session data, completed session data, snapshot data (note that snapshot data only applies to the first level of aggregation). For each of these 3 categories, the various metrics are provided.

In addition to the client data, the RAM stores Alerts, Web Services and RSS feeds. These can also, or alternately, be customized for the client. For example, the client may want an alert if the sales volume on certain of its products is above or below a predetermined threshold. The client may also want similar alerts on an industry basis.

As can be seen, the hierarchical data structure allows quick indexing to desired, pre-computed data. For example, a client 1 can quickly index to client 1, day, snapshot of total items in shopping carts.

Display Modules

Figure 6:
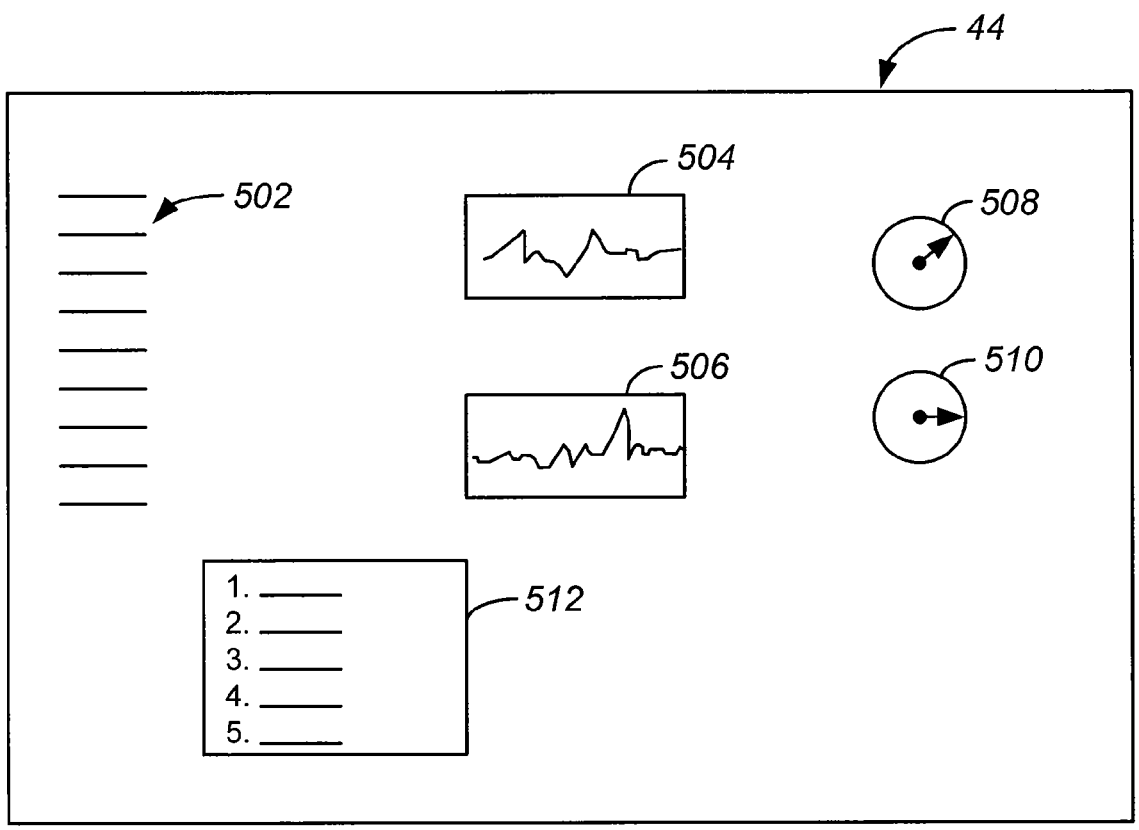
FIG. 6 illustrates an embodiment of a real-time monitor reporter window on a client computer.

FIG. 6 illustrates an embodiment of a real-time monitor reporter window 44 on a client computer. A list of report modules 502 is provided. This can be dragged and dropped to the right of the list to open the report module window. Examples of report modules include graphs 504 and 506, speedometers 508 and 510, and table 512. Alternately, a default or configured grouping can be used. The graphs provide an indication of activity over time, while the speedometers provide an instantaneous (e.g., last 30 second) count or snapshot. Examples of a speedometer include total visitors on the site, total dollar amount purchased or in shopping carts, etc. Table 512 could be the top 10 referring sites, top pages viewed on the website, top products bought, etc. The graphs and speedometers can be selected by the client, such as to track sales of a product for which a promotion was just released.

To improve speed, each report module is independent and asynchronously updated compared to the other report modules. The report modules may be implemented in Flash, Ajax, HTML or Java to provide speed of presentation while still pulling data from RAM 35 through Analysis module 40 (Ajax, Flash, etc.) in the Web Analytics Server System. The report modules periodically request new data, such as every 30 seconds, every minute, etc. The time period can be reconfigured as desired.

In one embodiment, in order to limit RAM usage, speedometer data is only aggregated and stored for high value information. Examples include total visitors on site and dollar amount in shopping carts. Other data can be presented in appropriate increments, and refreshed at different intervals, depending on the type of data. Data may be separately provide for current (in-flight) sessions and completed sessions.

The data may be presented in the form that best fits the type of data, including bar graphs, line graphs, tables, speedometers and simple text/numbers (e.g., total sales: $xxx). The clients can select the type of display (e.g., bar vs. line graph) as well as the data tracked. The client can combine this with desired RSS feeds, Web Services and Alerts. The client can specify the granularity of data, including not just time periods, but also geographic region.

Redundancy, Recovery

In one embodiment, 3-way redundancy is provided to allow quick recovery from crashes. (1) the RAM data is mirrored in another RAM, a fail-over RAM (with associated fail-over RAM server and Real Time Analytics Application), allowing instant recovery by switching to the fail-over RAM if one RAM goes down. (2) The flat file format is stored in a local disk database 38 (see FIG. 2), as opposed to the relational database format used for long term database storage. Thus, the current days data can be quickly re-loaded since it is already in the flat file format used in RAM. At most, the most recent aggregations would need to be re-aggregated. (3) The data can be re-streamed from the disk storage associated with the upstream processing, such as the session aggregator or transformer.

It will be understood that modifications and variations may be effected without departing from the scope of the novel concepts of the present invention. For example, SRAM instead of RAM could be used for storing some of the more important data. Log files could be periodically polled for the click events, and non-Flash type software could be used for the reporting. The data could be transformed, but not grouped by session. Other upstream organization of the data could be done, or none, before loading the data in RAM. A quickly accessible file structure other than flat files or tables could be used in RAM. Accordingly, the foregoing description is intended to be illustrative, but not limiting, of the scope of the invention which is set forth in the following claims.

What is claimed is:

1. A method for tracking web usage data, comprising:
   collecting, in a server system, data corresponding to monitored actions on at least one web site for a predetermined period of time, wherein each of the at least one web sites is identified by a client ID;
   pre-processing said data to perform a first level of aggregation indexed by at least the client ID, said first level of aggregation including current sessions, completed sessions, and a snapshot of current activity, for the predetermined period of time, and calculating a plurality of metrics for said first level of aggregation;
   streaming said data to a RAM server;
   aggregating said data into multiple aggregate groups desired for display, said aggregate groups including the first level aggregation, further including a second level aggregation within each client ID for a plurality of time periods, further including a third level of aggregation within each time period, the third level of aggregation including current session data and complete session data, wherein said aggregating said data into multiple aggregate groups occurs prior to a request to display said data;
   storing said aggregated data in a hierarchical structure in a RAM in said server system;
   calculating the plurality of metrics for each of the multiple aggregate groups;
   repeating the steps of collecting, pre-processing, streaming, aggregating, storing, and calculating; and
   providing said plurality of metrics from said RAM to a client at a client computer.

2. The method of claim 1 wherein said data is indexed by at least a client ID and a time period aggregation.

3. The method of claim 1 further comprising pre-processing said data upstream of said RAM to calculate a plurality of metrics and to perform a first level of aggregation.

4. The method of claim 1 wherein a portion of said data in said RAM is provided to said client at intervals of ten minutes or less.

5. The method of claim 1 further comprising:
   receiving additional data from at least one of an RSS feed, web services and alerts; and
   storing said additional data in said RAM.

6. The method of claim 1 further comprising:
   providing a plurality of report modules on said client computer;
   asynchronously retrieving data from said RAM for a plurality of said report modules.

7. A method for tracking web usage data, comprising:
   collecting, in a server system, data corresponding to monitored actions on a web site;
   aggregating said data into aggregate groups desired for display;
   storing said aggregated data in a hierarchical structure in a RAM in said server system;
   providing said data from said RAM to a client at a client computer; and
   mirroring said data in said RAM in a fail-over RAM.

8. The method of claim 1 further comprising:
   storing said data in said RAM in a flat file structure in local nonvolatile memory; and
   re-loading said RAM from said nonvolatile memory in the event of data loss in said RAM.

9. The method of claim 8 further comprising:
   re-aggregating a first level of aggregation upstream of said RAM and resending re-aggregated data and current data to said RAM.

10. A method for tracking web usage data, comprising:
    collecting, in a server system, data corresponding to monitored actions on at least one web site, wherein each of the at least one web sites is identified by a client ID;
    pre-processing said data to calculate a plurality of metrics and to perform a first level of aggregation, and indexing said data by at least the client ID;
    streaming said data to a RAM server;
    aggregating said data into multiple aggregate groups desired for display, wherein said aggregating occurs prior to a request to display said data;
    storing said aggregated data in a hierarchical structure in a RAM in said RAM server system;
    calculating a plurality of metrics for the multiple aggregate groups;
    storing the plurality of metrics in the RAM;
    providing a plurality of report modules on a client computer; and
    asynchronously retrieving said plurality of metrics from said RAM for a plurality of said report modules.

11. The method of claim 10 further comprising:
    receiving additional data from at least one of an RSS feed, web services and alerts; and
    storing said additional data in said RAM.

12. A system for tracking web usage data, comprising:
    a collector server configured to collect data corresponding to monitored actions on at least one web site, wherein each of the at least one web sites is identified by a client ID;
    a RAM server including an aggregation service to aggregate said data into aggregate groups desired for display, wherein said aggregation occurs prior to a request to display said data, wherein said data is indexed by at least the client ID and a time period aggregation;
    a RAM for storing said aggregated data in a hierarchical structure; and
    a remote client computer for displaying said data from said RAM.

13. The system of claim 12 further comprising:
    a transformer server coupled upstream from said RAM to pre-process said data to calculate a plurality of metrics and to perform a first level of aggregation.

14. The system of claim 13 wherein said transformer further organizes said data by client, wherein said client is at least one website.

15. The system of claim 12 wherein said first level of aggregation comprises a time interval of ten minutes or less.

16. The system of claim 12 further comprising:

an input port for at least one of an RSS feed, web services and alerts, for receiving additional data; and said RAM server being configured to store said additional data in said RAM.

17. The system of claim 12 further comprising:

a plurality of report modules on said client computer, said report modules being configured to asynchronously retrieve data from said RAM for a plurality of said report modules.

18. The system of claim 12 further comprising:

a fail-over RAM configured to mirror said data in said RAM.

19. The system of claim 12 further comprising:

a local nonvolatile memory;

said RAM server being configured to store said data in said RAM in a flat file structure in said local nonvolatile memory, and to re-load said RAM from said nonvolatile memory in the event of data loss in said RAM.

20. The system of claim 19 further comprising:

a transformer server coupled upstream from said RAM to pre-process said data to calculate a plurality of metrics and to perform a first level of aggregation, said transformer server being configured to re-aggregate a first level of aggregation upstream of said RAM and resending re-aggregated data and current data to said RAM.

21. A system for tracking web usage data, comprising:

a collector server configured to collect data corresponding to monitored actions on at least one web site, wherein each of the at least one web sites is identified by a client ID;

a transformer server in communication with said collector server to pre-process said data to calculate a plurality of metrics and to perform a first level of aggregation, said first level of aggregation indexed by at least said client ID;

a messaging system in communication with said transformer for transmitting processed data from said transformer;

a RAM server in communication with said messaging system and including an aggregation service to aggregate said data into multiple aggregate groups, said aggregate groups including the first level aggregation, further including a second level aggregation for a plurality of time periods, further including a third level of aggregation within each time period, the third level of aggregation including current session data and complete session data desired for display, wherein said aggregating said data into multiple aggregate groups occurs prior to a request to display said data;

a RAM coupled to said RAM server for storing said aggregated data in a hierarchical structure;

a remote client computer for displaying said data from said RAM; and a plurality of report modules on said client computer, said report modules being configured to asynchronously retrieve data from said RAM for a plurality of said report modules.

* * * * *